US008591073B2

(12) United States Patent
Peck et al.

(10) Patent No.: US 8,591,073 B2
(45) Date of Patent: Nov. 26, 2013

(54) BEACON LIGHT WITH REFLECTOR AND LIGHT EMITTING DIODES

(75) Inventors: John Patrick Peck, Manasquan, NJ (US); William S. Leib, III, Tinton Falls, NJ (US)

(73) Assignee: Dialight Corporation, Farmingdale, NJ (US)

(*) Notice: Subject to any disclaimer, the term of this patent is extended or adjusted under 35 U.S.C. 154(b) by 457 days.

(21) Appl. No.: 12/353,895

(22) Filed: Jan. 14, 2009

(65) Prior Publication Data
US 2009/0219715 A1    Sep. 3, 2009

Related U.S. Application Data

(63) Continuation-in-part of application No. 11/437,167, filed on May 19, 2006, now Pat. No. 7,758,210, which is a continuation-in-part of application No. 11/300,770, filed on Dec. 15, 2005, now Pat. No. 7,568,821, which is a continuation-in-part of application No. 11/069,989, filed on Mar. 3, 2005, now Pat. No. 7,160,004.

(60) Provisional application No. 61/021,210, filed on Jan. 15, 2008.

(51) Int. Cl.
*F21V 7/04* (2006.01)

(52) U.S. Cl.
USPC ............... 362/297; 362/247; 362/296.07

(58) Field of Classification Search
USPC ............ 362/237, 241, 247, 296.05, 296.07, 362/296.08, 297, 302, 304, 346, 348
See application file for complete search history.

(56) References Cited

U.S. PATENT DOCUMENTS

| 5,642,933 | A | 7/1997 | Hitora |
| 5,769,532 | A | 6/1998 | Sasaki |
| 5,800,051 | A | 9/1998 | Gampe et al. |
| 5,929,788 | A | 7/1999 | Vukosic |
| 6,183,100 | B1 | 2/2001 | Suckow et al. |
| 6,238,073 | B1 | 5/2001 | Ito et al. |
| 6,425,678 | B1 | 7/2002 | Verdes et al. |
| 6,464,373 | B1 | 10/2002 | Petrick |
| 6,474,852 | B1 * | 11/2002 | Ohkohdo et al. .............. 362/241 |
| 6,533,446 | B2 | 3/2003 | Chen et al. |
| 6,637,921 | B2 | 10/2003 | Coushaine |
| 6,717,526 | B2 | 4/2004 | Martineau et al. |
| 6,762,695 | B1 | 7/2004 | Eslambolchi et al. |
| 6,857,762 | B2 * | 2/2005 | Shimokawa et al. ......... 362/247 |

(Continued)

FOREIGN PATENT DOCUMENTS

JP    2004341067    12/2004

OTHER PUBLICATIONS

Partial European Search Report for EP Application EP 06110676, Mar. 30, 2007.

(Continued)

*Primary Examiner* — Y My Quach Lee

(57) ABSTRACT

The present invention is directed to a beacon light with a light emitting diode (LED) reflector optic. In one embodiment, the LED reflector optic includes a reflector having a plurality of reflecting surfaces and being associated with at least one optical axis, each reflecting surface including a curved cross-section and at least one LED positioned at a focal distance of a respective one of the plurality of reflecting surfaces.

18 Claims, 14 Drawing Sheets

(56) References Cited

U.S. PATENT DOCUMENTS

| | | |
|---|---|---|
| 6,867,710 B2 | 3/2005 | Wobben |
| 6,948,830 B1 | 9/2005 | Petrick |
| 7,160,004 B2 | 1/2007 | Peck |
| 7,270,449 B2 * | 9/2007 | Uke .............................. 362/346 |
| 7,401,958 B2 | 7/2008 | Okada |
| 7,461,952 B2 * | 12/2008 | Trenchardl et al. ........... 362/241 |
| 7,481,561 B2 | 1/2009 | Okuda |
| 7,568,821 B2 | 8/2009 | Peck et al. |
| 7,758,210 B2 | 7/2010 | Peck |
| 7,832,908 B2 | 11/2010 | Peck et al. |
| 2003/0193807 A1 | 10/2003 | Rizkin |
| 2004/0042212 A1 | 3/2004 | Du et al. |
| 2004/0057234 A1 | 3/2004 | Mohacsi |
| 2004/0085764 A1 | 5/2004 | Martin et al. |
| 2005/0128744 A1 | 6/2005 | You et al. |
| 2005/0156531 A1 | 7/2005 | Young |
| 2006/0012990 A1 | 1/2006 | Walser et al. |
| 2006/0176702 A1 | 8/2006 | Shen et al. |
| 2006/0198141 A1 | 9/2006 | Peck et al. |
| 2006/0291201 A1 | 12/2006 | Smith |
| 2007/0211487 A1 | 9/2007 | Sormani |
| 2008/0192480 A1 | 8/2008 | Rizkin |
| 2008/0285295 A1 | 11/2008 | Schug |
| 2010/0008082 A1 | 1/2010 | Brass et al. |

OTHER PUBLICATIONS

PCT Search Report and Written Opinion for PCT/US07/68967, Sep. 15, 2008.

Extended European Search Report for Application No. EP06110676, Jun. 20, 2007.

International Search Report and Written Opinion for PCT/US11/40195; Oct. 3, 2011, copy consists of 12 unnumbered pages.

International Preliminary Report on Patentability (IPRP) for PCT/US2011/040195, Jan. 3, 2013, copy consists of 10 unnumbered pages.

* cited by examiner

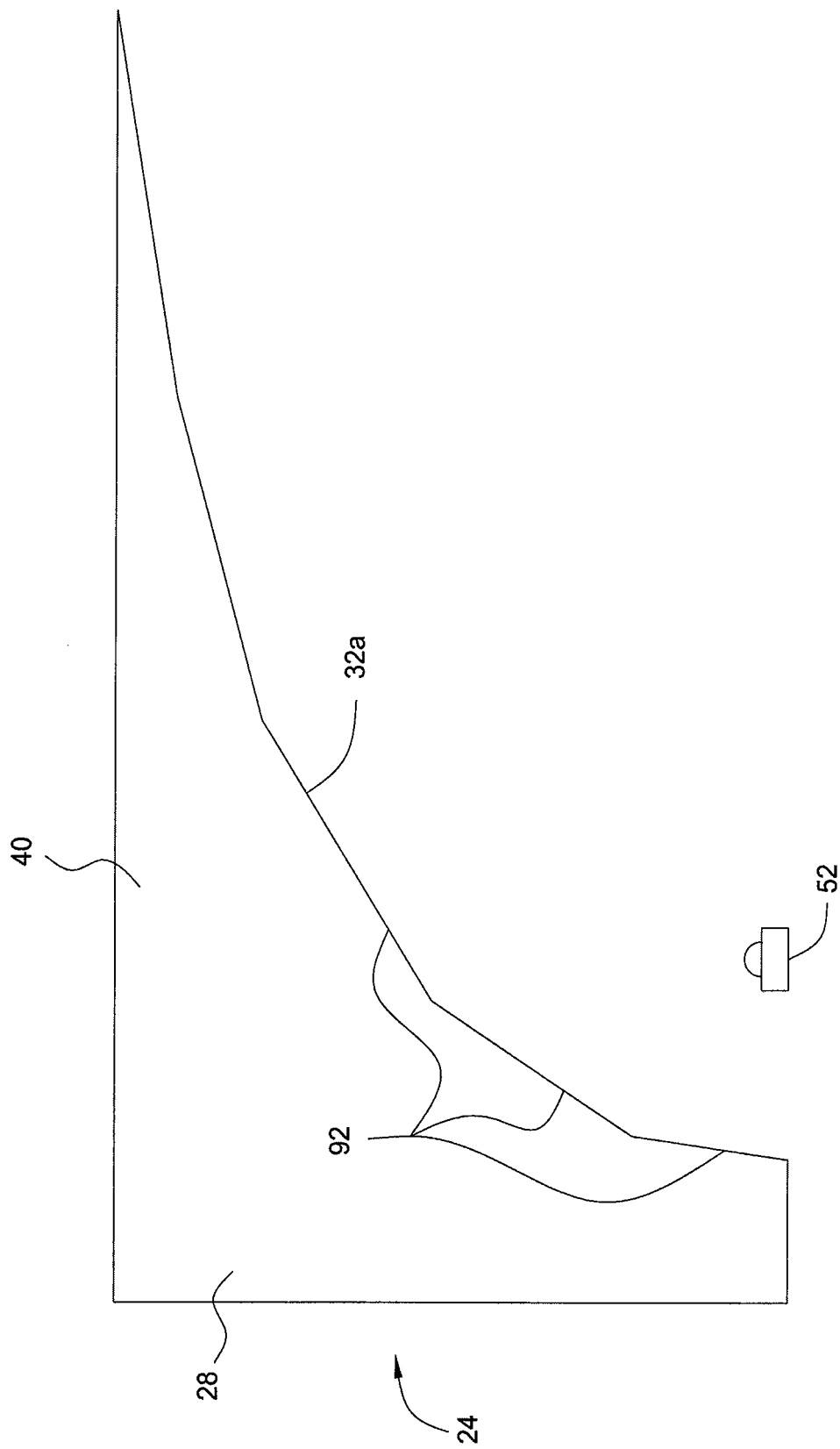

BEACON LIGHT WITH REFLECTOR AND LIGHT EMITTING DIODES

CROSS REFERENCE TO RELATED APPLICATIONS

This application is a continuation-in-part of U.S. patent application Ser. No. 11/437,167, filed May 19, 2006, now U.S. Pat. No. 7,758,210, which is a continuation-in-part of U.S. patent application Ser. No. 11/300,770, filed Dec. 15, 2005, now U.S. Pat. No. 7,568,821, which is a continuation-in-part of U.S. patent application Ser. No. 11/069,989, filed Mar. 3, 2005, now U.S. Pat. No. 7,160,004. This application also claims priority under 35 U.S.C. §119(e) to U.S. provisional patent application Ser. No. 61/021,210, filed on Jan. 15, 2008, which is hereby incorporated by reference in its entirety.

BACKGROUND OF THE INVENTION

1. Field of the Invention

The present invention generally relates to a light source, and more particularly to a light-emitting diode (LED)-based beacon light.

2. Description of the Related Art

A beacon light such as, for example, an aircraft obstruction light, can be used to mark an obstacle that may provide a hazard to aircraft navigation. Beacon lights are typically used on buildings, towers, and other structures taller than about 150 feet. Previous beacon lights generally exhibit relatively poor energy efficiency, which can prohibit the use of solar panels to power the beacon light. Previous beacon lights may also contribute to light pollution, i.e., direct light at angles undesirably above and below a specified plane. Previous beacon lights may also be too large and heavy for climbers to carry and therefore may require additional machinery or manpower to be hoisted into position.

SUMMARY OF THE INVENTION

Various deficiencies of the prior art are addressed by the present invention, one embodiment of which is a beacon light having a light-emitting diode (LED) reflector optic. In one embodiment, the LED reflector optic comprises a reflector having a plurality of reflecting surfaces and being associated with at least one optical axis, each reflecting surface comprising a curved cross-section and at least one LED positioned at a focal distance of a respective one of said plurality of reflecting surfaces.

In one embodiment, the present invention is generally directed towards a reflector optic. In one embodiment, the reflector optic comprises a plurality of reflecting means for reflecting light in a direction of at least one optical axis, each reflecting means comprising a curved cross-section and at least one light emitting means for emitting a hemisphere of light positioned at a focal distance of a respective one of said plurality of reflecting means.

In one embodiment, a method comprises arranging a plurality of reflecting surfaces relative to each other, each one of the plurality of reflecting surfaces comprising a curved cross-section, positioning at least one LED at a focal distance of a respective one of said plurality of reflecting surfaces and transmitting light from the at least one LED onto the at least one of the plurality of reflecting surfaces.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 19 depicts a partial sectional side view of an embodiment of the LED reflector optic having a faceted reflecting surface;

DETAILED DESCRIPTION

Figure 1:
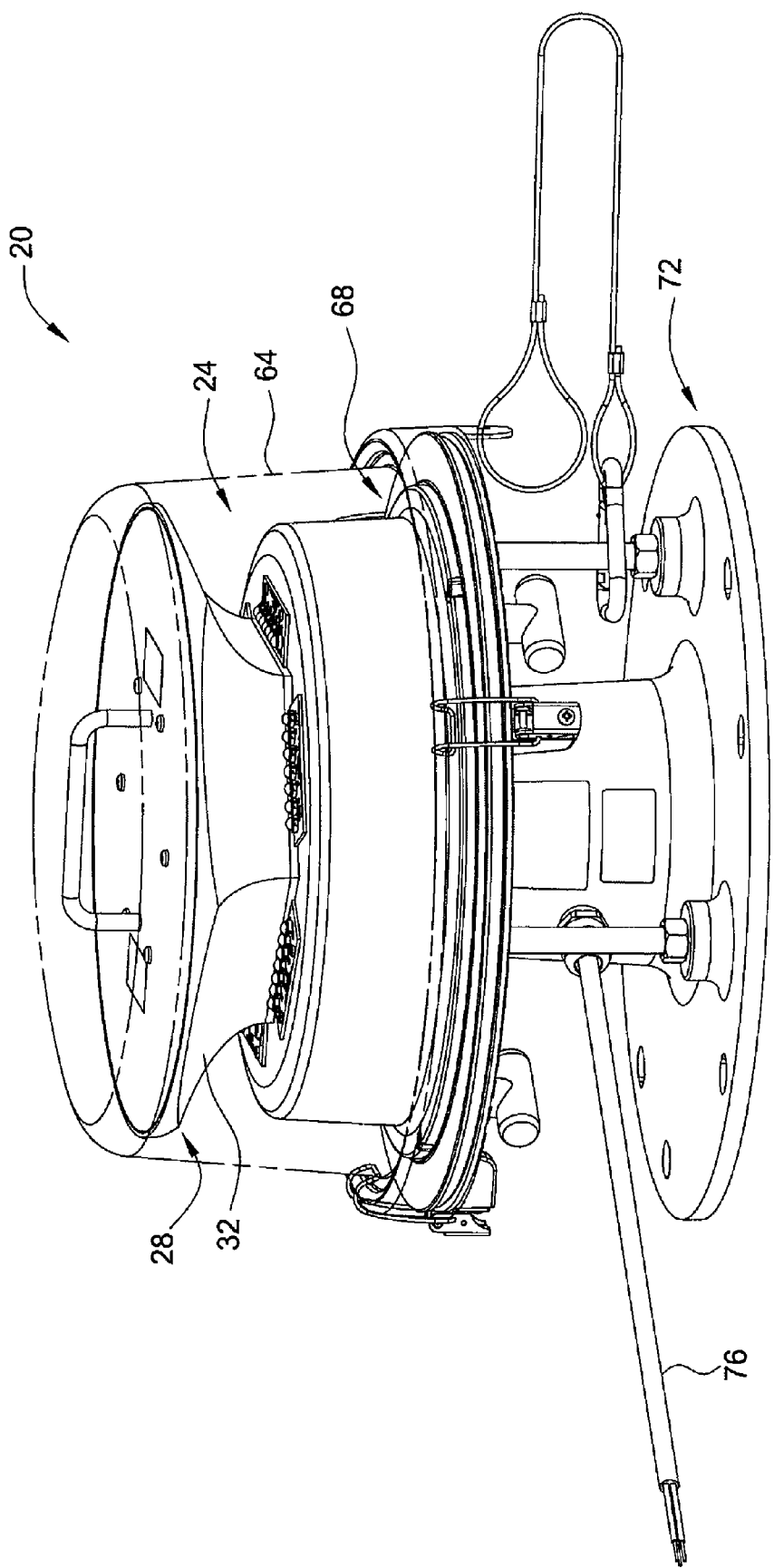
FIG. 1 depicts a perspective view of an embodiment of the beacon light according to the present invention.

FIG. 1 depicts a perspective view of a beacon light 20 according to one embodiment of the present invention. The beacon light 20 comprises an LED reflector optic 24. In one embodiment, the beacon light 20 also comprises a shield 64, a pedestal 68, a base 72, an electrical connection 76 to the beacon light 20, and circuitry (not shown) to drive the beacon light 20. In one embodiment, the drive circuitry (not shown) is capable of strobing the LED reflector optic 24. The pedestal 68 supports the LED reflector optic 24, and the base 72 provides a means for attaching the beacon light 20 to a structure.

Figure 2:
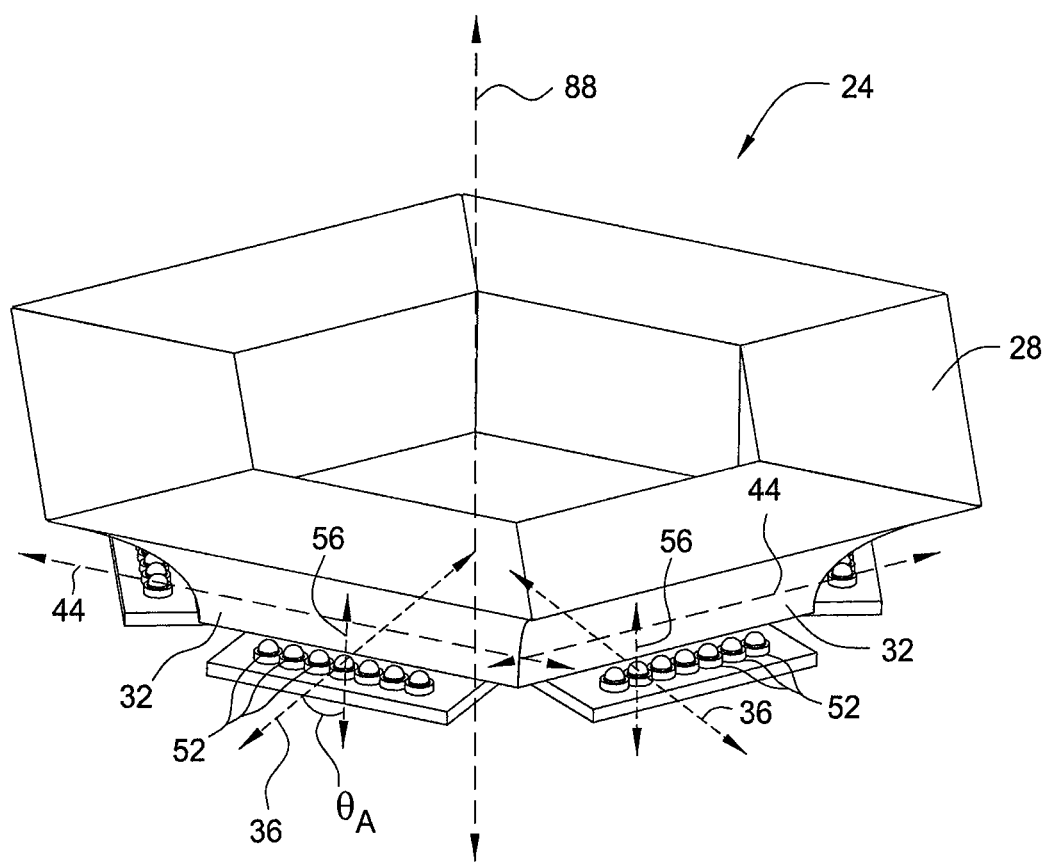
FIG. 2 depicts a perspective view of an embodiment of the LED reflector optic of the beacon light depicted in FIG. 1.

FIG. 2 depicts a perspective view of an embodiment of the LED reflector optic 24 according to the present invention. In one embodiment, the LED reflector optic 24 comprises a reflector 28 having a plurality of reflecting surfaces 32, i.e., a segmented reflector 28.

Figure 8:
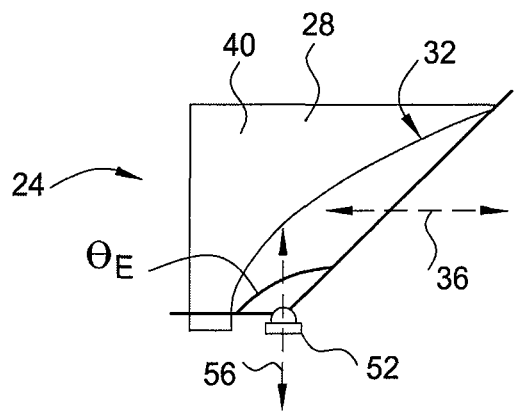
FIG. 8 depicts a partial sectional side view of an embodiment of the LED reflector optic depicted in FIG. 2.

Each reflecting surface 32 comprises a cross-section 40 (as depicted in FIG. 8) which is projected along an associated linear extrusion axis 44. In one embodiment, the linearly projected cross-section 40 comprises a conic section. A conic section provides an advantageous reflected light intensity distribution. In one embodiment, the cross-section 40 of the reflecting surface 32 comprises at least one of: a conic or a substantially conic shape. In one embodiment, the conic shape comprises at least one of: a hyperbola, a parabola, an ellipse, a circle, or a modified conic shape.

Each reflecting surface 32 has an associated optical axis 36. In one embodiment, each reflecting surface 32 reflects a beam of light having an angular distribution horizontally symmetric to the associated optical axis 36, i.e. symmetric about the associated optical axis 36 in directions along the extrusion axis 44.

For each reflecting surface 32, the LED reflector optic 24 comprises at least one associated LED 52. The LED 52 has a central light-emitting axis 56, and typically emits light in a hemisphere centered and concentrated about the central light-emitting axis 56. The LED 52 is positioned relative to the associated reflecting surface 32 such that the central light-emitting axis 56 of the LED 52 is angled at a predetermined angle $\theta_A$ relative to the optical axis 36 associated with the reflecting surface 32. In a preferred embodiment, $\theta_A$ has a value of about 90°. In one embodiment, the about 90° has a tolerance of ±30°, i.e., from 60° to 120°.

Figure 3:
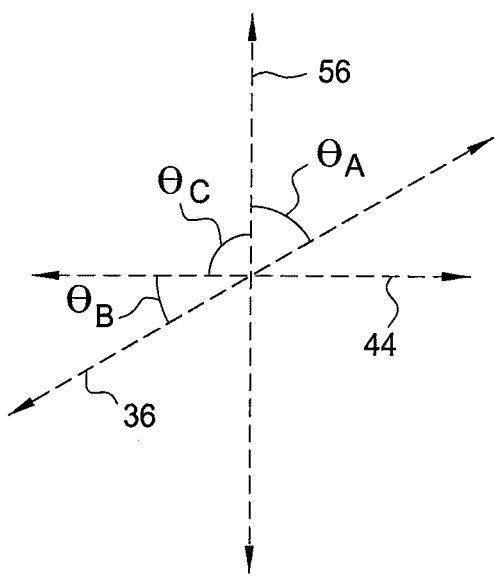
FIG. 3 depicts a perspective view of an embodiment of the angular relationship between the optical axis associated with the reflecting surface of the LED reflector optic depicted in FIG. 2, the central light emitting axis of the LED of the LED reflector optic, and the extrusion axis of the reflecting surface.

In one embodiment, for a specific reflecting surface 32 and associated LED 52, the central light-emitting axis 56 of the LED 52, the optical axis 36 associated with the reflecting surface 32, and the extrusion axis 44 of the reflecting surface 32 form orthogonal axes of a 3-axes linear coordinate system. Namely, the central light-emitting axis 56, the optical axis 36, and the extrusion axis 44 are mutually perpendicular. FIG. 3 depicts a representation of the mutually perpendicular relationship between the central light-emitting axis 56, the optical axis 36, and the extrusion axis 44. In FIG. 2, $\theta_B$ is the angle between the optical axis 36 and the extrusion axis 44, and $\theta_C$ is the angle between the central light emitting axis 56 and the extrusion axis 44. In one embodiment, the mutually perpendicular relationship between the central light-emitting axis 56, the optical axis 36, and the extrusion axis 44 is approximate. For example, each of the central light-emitting axis 56, the optical axis 36, and the extrusion axis 44 can be angled at 90° from each of the other two axes, with a tolerance, in one embodiment, of ±30°.

In one embodiment, for each reflecting surface 32, the LED reflector optic 24 comprises a plurality of associated LEDs 52. In one embodiment, the plurality of associated LEDs 52 are arranged along a line, as depicted in FIG. 2, parallel to the extrusion axis 44 of the reflecting surface 32. In one embodiment, the plurality of associated LEDs 52 are staggered about a line. For example, in one embodiment, the plurality of associated LEDs 52 are staggered about a line, with the staggering comprising offsetting the LEDs 52 from the line by a predetermined distance in alternating directions perpendicular to the line. Also, in one embodiment, the LED 52, or the plurality of LEDs 52, are positioned at the focal distance of the reflecting surface 32.

Figure 4:
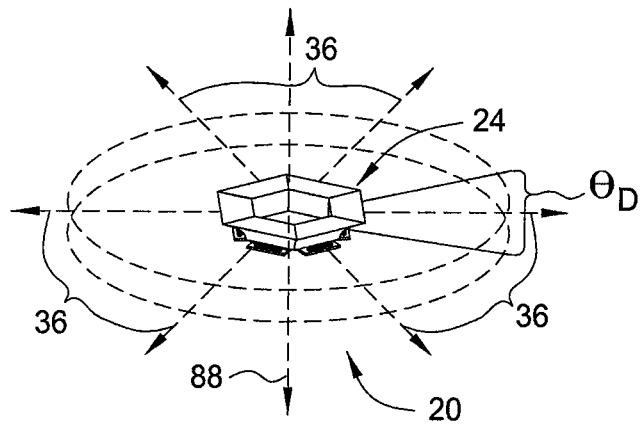
FIG. 4 depicts a partial perspective view of an embodiment of the beacon light depicted in FIG. 1.

FIG. 4 depicts a partial perspective view of an embodiment of the beacon light 20 in which the beacon light 20 emits light outward over a 360° angular distribution about a central axis 88 of the reflector 28 of the LED reflector optic 24. Such a 360° angular distribution of reflected light may be a requirement for the beacon light 20 to provide obstruction warning in all directions.

The light emitted from the beacon light 20 has a predetermined beam spread $\theta_D$, as depicted in FIG. 4. The beam spread $\theta_D$ is the angle, vertically perpendicular to the optical axes 36 of the reflecting surfaces 32, over which the intensity of the emitted light is greater than 50% of the peak intensity of the emitted light. In a preferred embodiment, the beacon light 20 has a beam spread $\theta_D$ of less than 3°. In another embodiment, the beacon light 20 has a beam spread $\theta_D$ of less than 10°.

Figure 5:
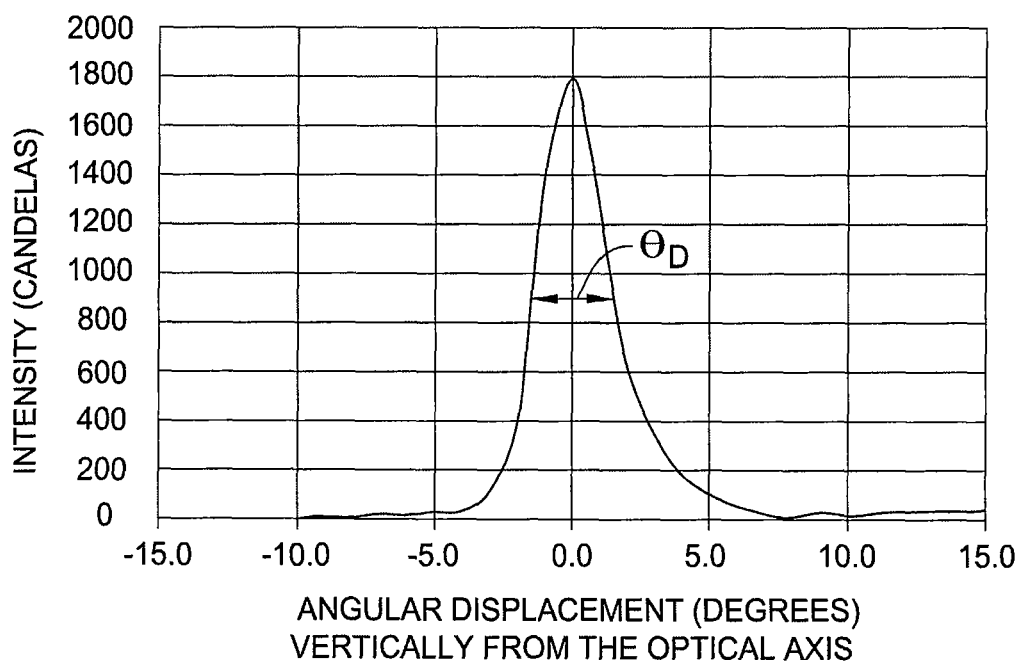
FIG. 5 is a graph depicting a representation of the intensity, versus angular displacement vertically from the optical axis, of light emitted from an embodiment of the beacon light depicted in FIG. 1.

FIG. 5 is a graph depicting a representation of the light intensity, versus angular displacement vertically perpendicular to the optical axes 36, emitted from an embodiment of the beacon light 20. FIG. 5 shows the beam spread $\theta_D$ for this embodiment is approximately 3°, i.e., about 1.5° on either side of a plane containing the optical axes 36.

Figure 6:
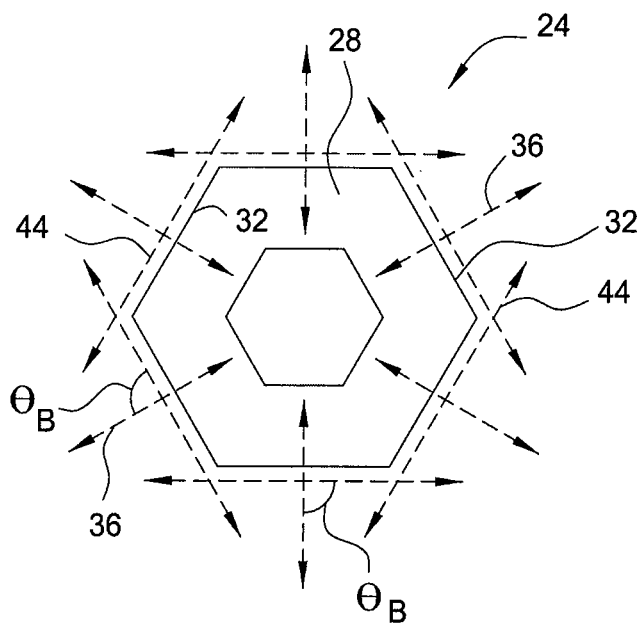
FIG. 6 depicts a sectional top view of an embodiment of the reflector of the LED reflector optic depicted in FIG. 2.

The plurality of reflecting surfaces 32 of the reflector 28 are arranged so that each of the associated extrusion axes 44 is angled relative to the extrusion axis 44 of another reflecting surface 32. In one embodiment, the plurality of extrusion axes 44 occupy a single plane and intersect each other to outline a polygon. Namely, a top view cross-section of the reflector comprises a perimeter which is a polygon. FIG. 6 depicts a sectional top view of an embodiment of the reflector 28, showing the plurality of associated extrusion axes 44 intersecting each other to form a hexagon. Such an embodiment achieves the 360° angular distribution, relative to the central axis 88 of the reflector 28, of light emitted from the LED reflector optic 24. Each reflecting surface 32 reflects light in the direction of the optical axis 36 associated with that reflecting surface 32, and through an angular distribution horizontally symmetric to and centered to the optical axis 36.

Although FIG. 6 depicts a polygon embodiment of the reflector 28 having six reflecting surfaces 32, in another polygon embodiment the reflector 28 has at least three reflecting surfaces 32.

Figure 7:
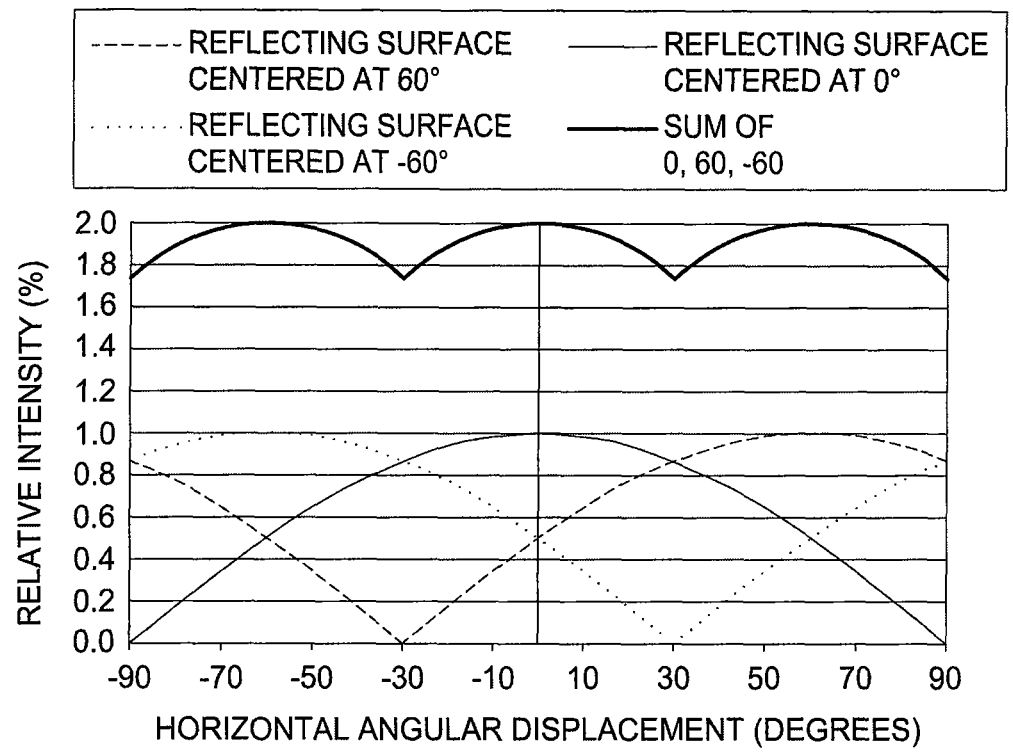
FIG. 7 is a graph depicting a representation of the relative intensity, versus angular displacement, of light reflected from three different adjacent reflecting surfaces, and the sum thereof, of an embodiment of the LED reflector optic depicted in FIG. 2.

In one embodiment, each horizontal angular distribution of reflected light associated with a specific reflecting surface 32 overlaps the horizontal angular distribution of reflected light associated with an adjacent reflecting surface 32. FIG. 7 is a graph depicting a representation of the relative intensity, versus horizontal angular displacement, of light reflected from three different adjacent reflecting surfaces 32, and the sum thereof. The thick solid line of FIG. 7 represents the overall intensity of light emitted from the LED reflector optic 24, including light reflected from all of the three adjacent reflecting surfaces 32. The thin solid line represents the intensity of light reflected from the reflecting surface 32 associated with the optical axis 36 about which the angular displacement of FIG. 7 is centered, i.e. the reflecting surface 32 having the optical axis at 0° as shown in FIG. 7. The dotted and dashed lines of FIG. 7 represent the intensity of light reflected from the two reflecting surfaces 32 adjacent and connected to the first reflecting surface 32. FIG. 7 shows that the light reflected from each reflecting surfaces 32 overlaps the light reflected from adjacent reflecting surfaces 32 to form an overall reflection of light from the reflector 28 which has a more uniform intensity profile, versus angular displacement, than the individual intensity profiles of light reflected from the individual reflecting surfaces 32.

In one embodiment, the intersection of the plurality of extrusion axes 44 does not necessarily outline a polygon. In one embodiment, light emitted from the LED reflector optic 24 does not have a 360° angular distribution relative to the central axis 88 of the reflector 28. Such an embodiment may instead achieve, for example, a 180° angular distribution.

In one embodiment, the plurality of reflecting surfaces 32 of the segmented reflector 28 are connected together.

The utilization of light emitted by the LED 52 by one embodiment of the LED reflector optic 24 provides an advantage of the present invention. To further understand this advantage, the utilization of light by one embodiment of the LED reflector optic 24 can be compared to the utilization of light in an alternative relative positioning of the LED 52 and the reflecting surface 32.

FIG. 8 depicts a partial sectional side view of an embodiment of the LED reflector optic 24. In the embodiment shown in FIG. 8, the reflecting surface 32 has a concave conic cross-section, and the central light-emitting axis 56 of the LED 52 is in the same plane as the shown cross-section. FIG. 8 also shows the angle $\theta_E$ over which light, emitted from the LED 52, is reflected by the reflecting surface 32.

Figure 9:
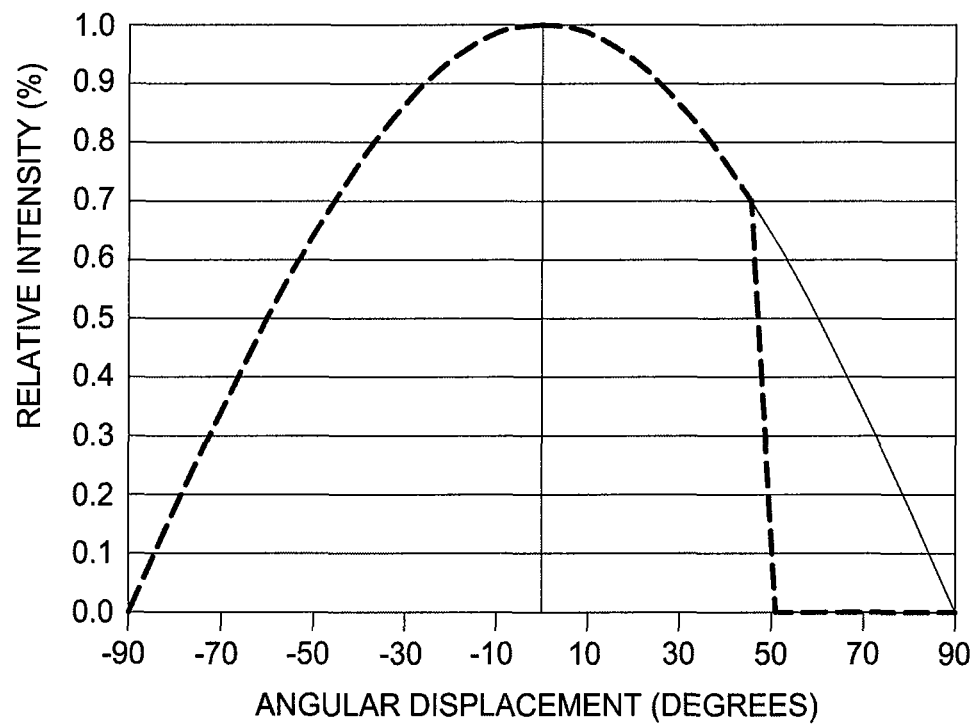
FIG. 9 is a graph depicting a representation of relative light intensity, versus angular displacement, for light typically emitted from the LED, and for light reflected by the embodiment of the LED reflector optic depicted in FIG. 8.

FIG. 9 is a graph depicting a representation of the relative intensity of light, versus angular displacement in the plane of FIG. 8, for light typically emitted by the LED 52, and for light reflected by the reflecting surface 32 of the LED reflector optic 24 shown in FIG. 8. The solid line of FIG. 9 represents the light intensity distribution typically emitted by the LED 52, i.e., without the reflecting surface 32 present, versus angular displacement relative to the central light emitting axis 56. The light intensity distribution emitted by the LED 52 is typically lambertian. However, other light intensity distributions may also benefit from the present invention. The light intensity distribution emitted by the LED 52 includes light over about 180°, i.e., about 90° on either side of the central light-emitting axis 56. The dotted line of FIG. 9 represents the portion of the light intensity distribution emitted by the LED 52 which is reflected by the reflecting surface 32 positioned relative to the LED 52 as shown in FIG. 8. The dotted line shows that light over the angle $\theta_E$, i.e., about 135°, of the angular distribution of the LED emission is reflected by the reflecting surface 32. The angle $\theta_E$ includes about 90° on one side of the central light-emitting axis 56 and about 45° on the other side of the central light-emitting axis 56. The portion of the LED emission which is reflected by the reflecting surface 32, i.e. the portion of the LED emission within angle $\theta_E$, is utilized light. The portion of the LED emission which is not reflected by the reflecting surface 32, i.e. the portion of the LED emission outside the angle $\theta_E$, is unutilized light.

Figure 10:
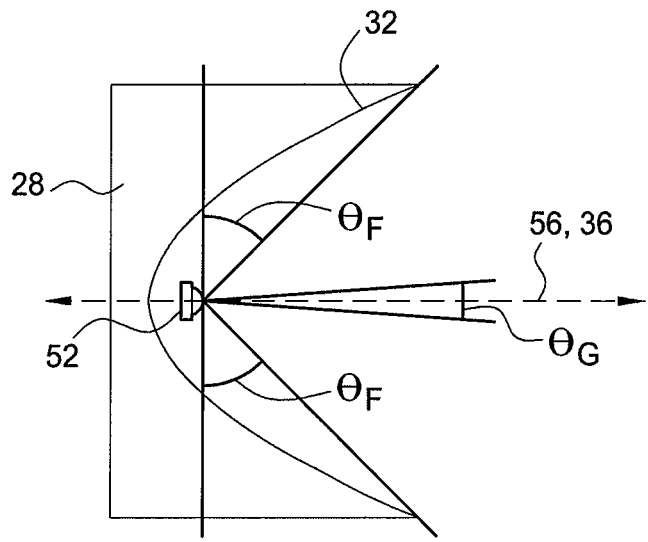
FIG. 10 depicts an embodiment of an alternative arrangement of the LED and reflecting surface.

FIG. 10 depicts an embodiment of an alternative relative positioning of the LED 52 and the reflecting surface 32. In this alternative arrangement, the central light-emitting axis 56 of the LED 52 is arranged to be parallel to the optical axis 36 of the reflecting surface 32.

Figure 11:
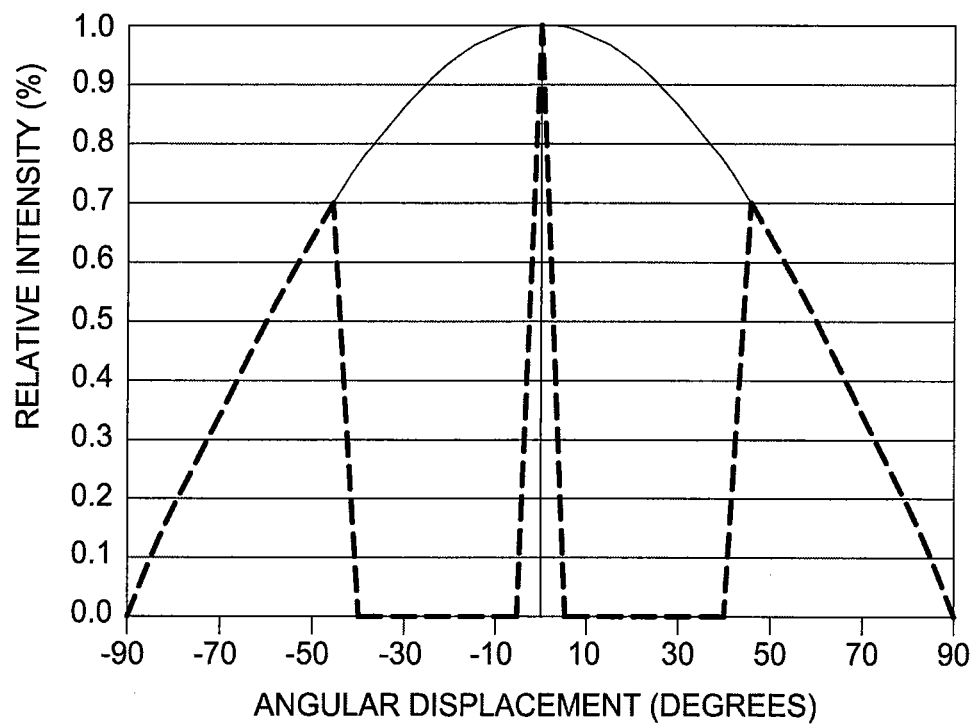
FIG. 11 is a graph depicting a representation of relative light intensity, versus angular displacement, for light typically emitted from the LED, and for light emitted from the embodiment of the alternative arrangement of the LED and reflecting surface depicted in FIG. 10.

FIG. 11 is a graph depicting a representation of the relative intensity of light, versus angular displacement in the plane of FIG. 10, for the typical light emission by the LED 52, and for light emitted by the alternative arrangement of the LED 52 and the reflecting surface 32 depicted in FIG. 10. The solid line of FIG. 11 represents the typical light intensity distribution emitted by the LED 52 without the presence of the reflecting surface 32. The dotted line of FIG. 11 represents the portion of the typical LED light intensity distribution which is utilized by the arrangement depicted in FIG. 10. The portion of light utilized comprises a first portion over an angle $\theta_G$, centered about the central light-emitting axis 56 and not reflected by the reflecting surface 32, and a second portion over an angle $\theta_F$ on either side of the central light-emitting axis 56, i.e., from 90° to 90°−$\theta_F$, and from −90° to −90°+$\theta_F$, wherein $\theta_F$ is about 45°. The first portion is utilized because if falls within the desired beam spread $\theta_D$ of the beacon light 20, and in one embodiment angle $\theta_G$ equals the beam spread $\theta_D$. The second portion is utilized because it is reflected by the reflecting surface 32 to also fall within the desired beam spread $\theta_D$ of the beacon light 20. An unutilized portion of the typical light intensity distribution which is over angles, relative to the central light emitting axis 56, from 0.5 $\theta_G$ to 90°−$\theta_F$ and from −0.5 $\theta_G$ to −90°+$\theta_F$, is not utilized because it is not reflected by the reflecting surface 32. The unutilized portion of the typical light intensity distribution emitted by the LED 52 from −0.5 $\theta_G$ to −90°+$\theta_F$ is undesirable and may be considered to be light pollution because it typically points downward towards the ground from, for example, a relatively high position.

Thus, FIG. 11 shows that the alternative relative positioning of the LED 52 and the reflecting surface 32 depicted in FIG. 10 does not utilize the majority of the high intensity central portion of the light intensity distribution typically emitted by the LED 52. By comparison, the embodiment of the LED reflector optic 24 of the present invention as depicted in FIG. 8 utilizes the majority of the high intensity central portion of the light intensity distribution typically emitted by the LED 52. A numerical comparison of the light utilizations depicted by FIGS. 9 and 11 shows that the area under the dotted line in FIG. 9 is about 45% greater than the area under the dotted line in FIG. 11. Thus, the embodiment of the LED reflector optic 24 depicted in FIG. 8 provides approximately a 45% increase in light utilization from a single LED 52, in comparison to the alternative arrangement depicted in FIG. 10.

Furthermore, the embodiment of the LED reflector optic 24 depicted in FIG. 8 provides the possibility of the reflector 28 having a reduced size relative to the embodiment of the alternative arrangement depicted in FIG. 10. For example, the reflector 28 depicted in FIG. 8 has a size which is reduced by about half in comparison to the embodiment of the reflector 28 depicted in FIG. 10.

The utilization of light by the embodiment of the LED reflector optic 24 depicted in FIG. 8 of the light emitted by the LED 52 provides an advantage of the present invention. However, the present invention nonetheless provides other advantages, and thus one embodiment of the LED reflector optic 24 comprises the LED 52 positioned such that the central light-emitting axis 56 is angled at the angle $\theta_A$ having a value of about 0°, as depicted in FIG. 10. In one embodiment, the about 0° has a tolerance of ±30°, i.e., from −30° to 30°. In another embodiment, the about 0° has a tolerance of ±10°, i.e., from −10° to 10°.

An exemplary illustration of another advantage provided by an aspect of the present invention is depicted in FIGS. 12-15. The projection of the cross-section 40 of the reflecting surface 32 along the linear extrusion axis 44 advantageously provides increased collimation of the reflected light.

Figure 12:
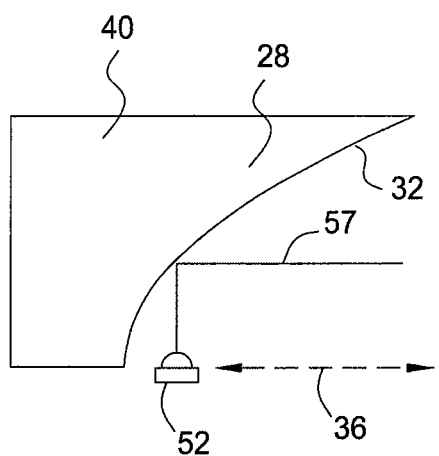
FIG. 12 depicts a partial side view of an embodiment of the LED reflector optic depicted in FIG. 2, showing mathematically simulated ray traces.

FIG. 12 depicts a partial side view of an embodiment of the LED reflector optic 24. In the embodiment of FIG. 12, the LED 52 is located at the focal distance of the reflecting surface 32 in a plane 47 (depicted in FIG. 16A). FIG. 12 also depicts mathematically simulated ray traces 57 showing the path of light traveling from the LED 52 to the reflecting surface 32 and outward from the reflector 28. Ray tracing is a technique that uses 3-D computer modeling and geometric optics to accurately determine the light path. FIG. 12 shows the ray traces 57 are parallel to the optical axis 36 in the depicted embodiment of the LED reflector optic 24.

Figure 13:
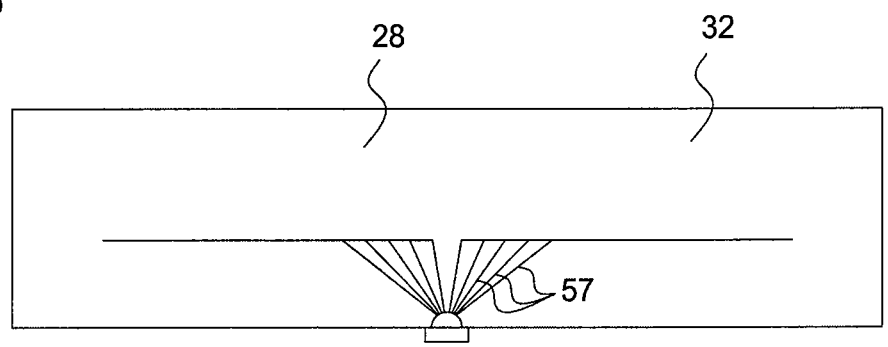
FIG. 13 depicts a partial front view of the embodiment of the LED reflector optic depicted in FIG. 12, showing the same ray traces shown in FIG. 12 from another view.

FIG. 13 depicts a partial frontal view of the embodiment of the LED reflector optic 24 depicted in FIG. 12, showing the same mathematically simulated ray traces 57 as FIG. 12, but from another view. Because the reflecting surface 32 of FIGS. 12 and 13 is a projection of the cross-section 40 along the linear extrusion axis 44, light traveling from the LED 52 to the reflecting surface results in well collimated light reflected parallel to the optical axis 36 of the reflecting surface 32.

Figure 14:
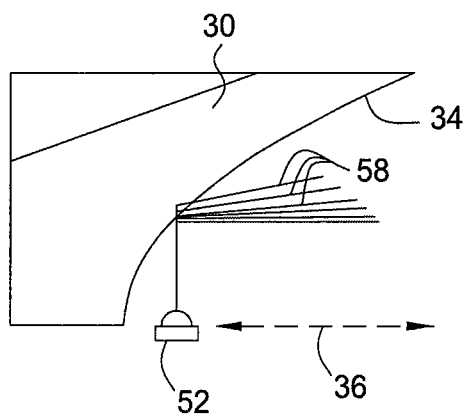
FIG. 14 depicts a partial side view of an embodiment of an alternative reflector having an alternative reflecting surface, showing mathematically simulated ray traces.
Figure 16B:
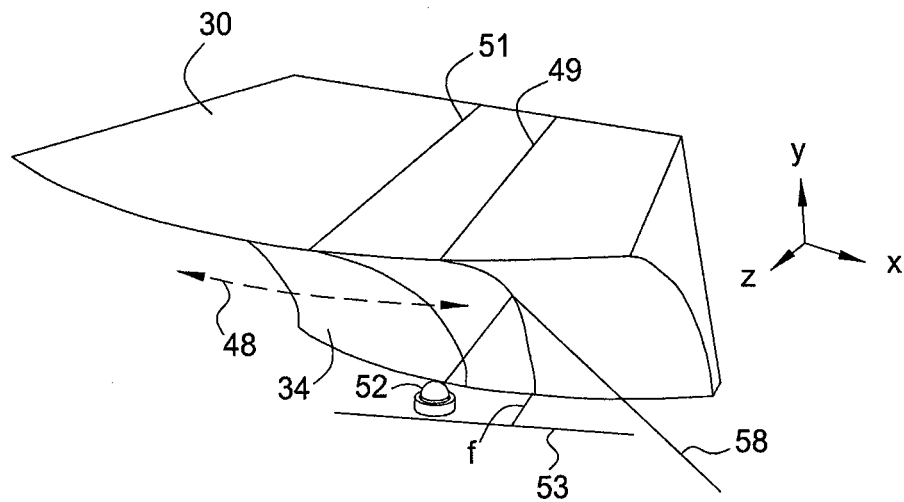
FIG. 16b depicts a partial perspective view of an embodiment the LED reflector optic having an embodiment of the alternative reflector comprising the alternative reflecting surface depicted in FIGS. 14 and 15.
Figure 17:
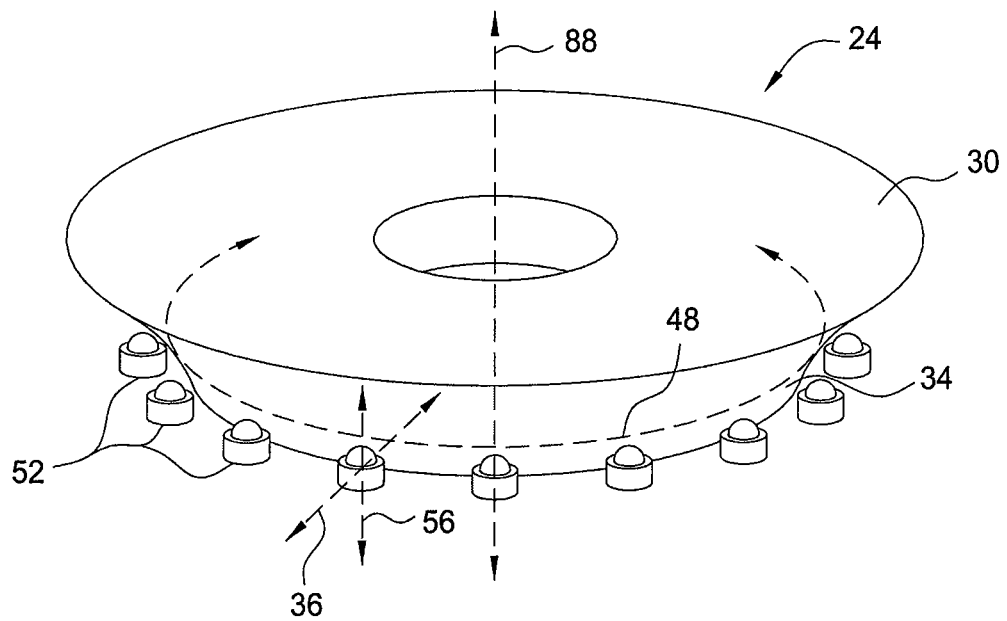
FIG. 17 depicts a perspective view of an embodiment of the LED reflector optic having an embodiment of the alternative reflector comprising the alternative reflecting surface.

By comparison, FIG. 14 depicts a partial side view of an embodiment of an alternative reflector 30 having an alternative reflecting surface 34 The alternative reflecting surface 34 has a cross-section that is projected along a curved trajectory 48 (as depicted in FIG. 17), not a linear axis. This curved trajectory is also known as a swept curvature. This alternative reflector 30 can be assembled with other reflectors. The resulting reflector can be continuous and form a circle or can be segmented depending on the radius of the curved trajectory and the number of reflector segments that are used. For example, the unsegmented reflector shown in FIG. 17 results when six reflector segments shown in FIG. 16B are assembled. Alternatively, a segmented reflector is formed when three of the reflector segments shown in FIG. 16B are assembled. The same result occurs if four or five of the reflector segments shown in FIG. 16B are assembled. Alternatively, the radius of the curved trajectory in FIG. 16B can be increased. A segmented reflector is then formed when six reflector segments shown in FIG. 16B, but with increased curved trajectory radii, are assembled.

In the embodiment of FIG. 14, the LED 52 is located at the focal distance of the alternative reflecting surface 34 in the plane 51 (depicted in FIG. 16B). FIG. 14 also depicts mathematically simulated ray traces 58 showing the path of light traveling from the LED 52, to the alternative reflecting surface 34 and outward from the alternative reflector 30.

Figure 15:
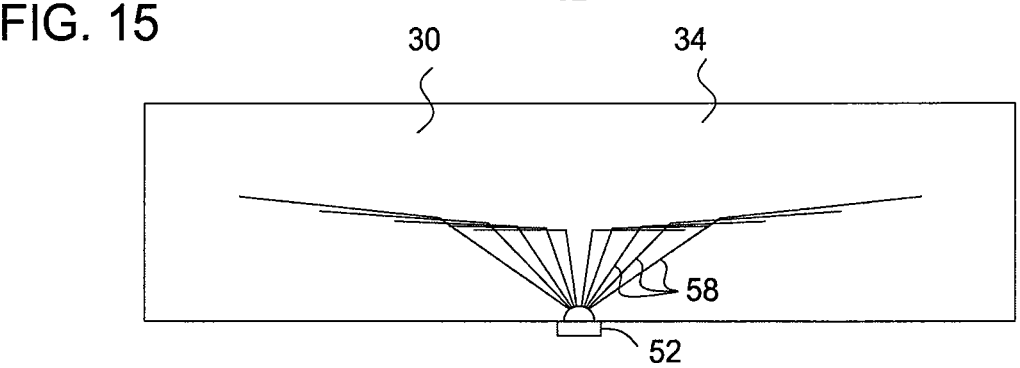
FIG. 15 depicts a partial front view of the embodiment of the alternative reflector having the alternative reflecting surface depicted in FIG. 14, showing the same ray traces shown in FIG. 14 from another view.

FIG. 15 depicts a partial front view of the embodiment of the alternative reflector 30 having the alternative reflecting surface 34 depicted in FIG. 14, and showing the same mathematically simulated ray traces 58 as FIG. 14, but from another view. FIGS. 14 and 15 shows that the light reflected by the alternative reflector 30 is not as well collimated as the light reflected by the reflector 28, as depicted in FIGS. 12 and 13. Light is reflected from the alternative reflecting surface 34 at angles vertically away from the optical axis 36.

Figure 16A:
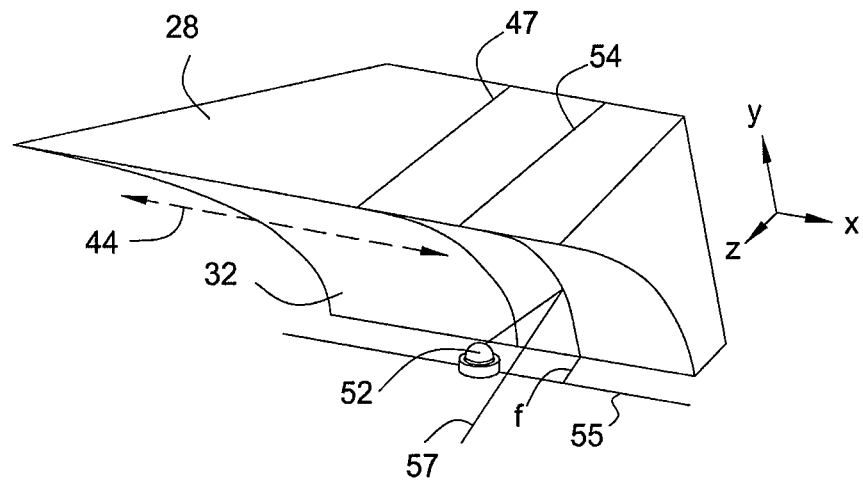
FIG. 16a depicts a perspective view of an embodiment of a segment, having the reflecting surface, of an embodiment of the LED reflector optic depicted in FIGS. 12 and 13.

FIG. 16A depicts a perspective view of an embodiment of a segment of the reflector 28 depicted in FIGS. 12 and 13, and FIG. 16B a partial perspective view of an embodiment of the alternative reflector 30 depicted in FIGS. 14 and 15. The increased collimation provided by the reflector 28, in comparison to the alternative reflector 30, can also be better understood in reference to FIGS. 16A and 16B. Generally speaking, a parabolic reflector, for example, receives light originating from its focal distance and reflects the light parallel to the optical axis of the reflector. If the reflector has the cross-section 40 projected along the linear extrusion axis 44, as in the embodiment of the reflector 28 depicted in FIG. 16A, then the parabolic system is lost only in the horizontal direction and is conserved in the vertical direction and the light will be collimated vertically. For example, considering light comprising vector components in the x, y and z directions depicted in FIG. 16A, line 55 demarks the focal length f for the vector component of light traveling in the y direction, and line 55 is common to the entire length of the reflector. Therefore the vector component of light emitted by LED 52 in the y direction strikes both plane 54 and plane 47 as arriving from the focal length.

By comparison, if the reflector is revolved, i.e. having the cross-section projected along the curved trajectory 48, as in the embodiment of the reflector 30 depicted in FIG. 16B, then the parabolic system is lost in both the horizontal and vertical directions. For example, FIG. 16B depicts a line 53 demarking the focal length f for the vector component of light traveling in the y direction, with respect to light arriving at plane 49, plane 49 being offset and angled horizontally from the plane 51. FIG. 16B shows that the LED 52 does not fall on the line 53 and thus does not emit a component of light in the y direction which strikes plane 49 as arriving from the focal length. Although, there may be at least one LED 52 that falls on line 53 (not shown), thus emitting a component of light in the y direction which strikes plane 49 as arriving from the focal length.

Thus, the embodiment of the reflector 28 having the projection of the cross-section 40 of the reflecting surface 32 along the linear extrusion axis 44 provides increased collimation of reflected light in comparison to the alternative reflector 30 having the alternative reflecting surface 34. However, the present invention nonetheless provides other advantages, and thus in one embodiment, as depicted in FIG. 17, the LED reflector optic 24 comprises the alternative reflector 30 having the alternative reflecting surface 34.

Figure 21:
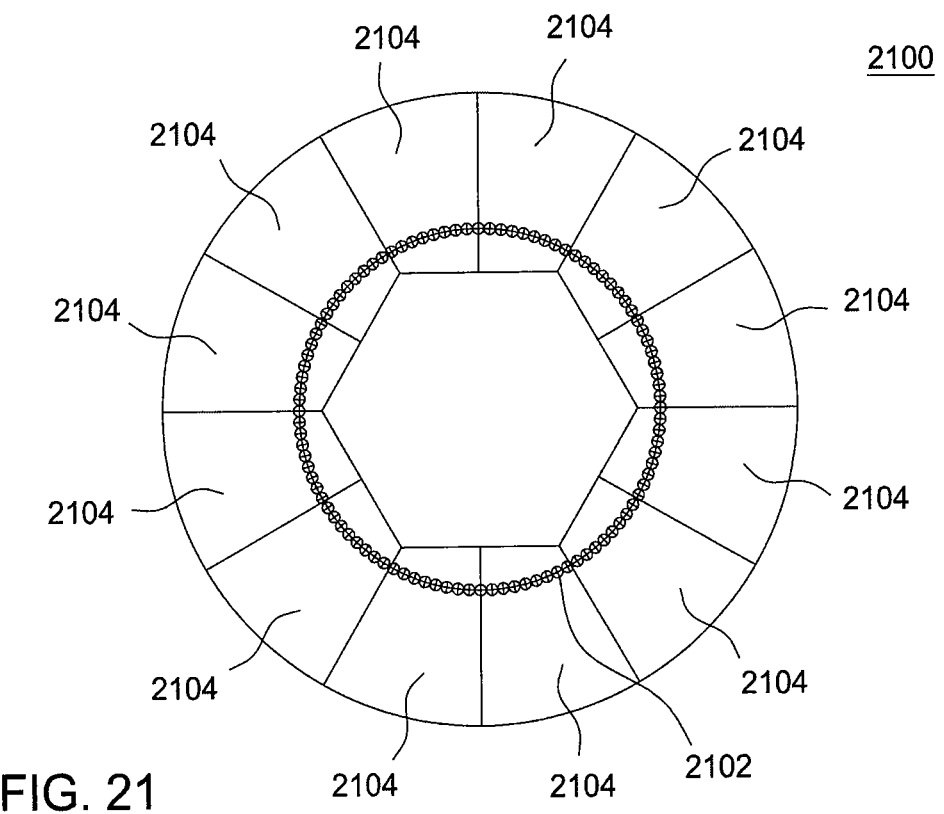
FIG. 21 depicts a revolved reflector.

One advantage of the circularly revolved reflector is that it may allow a higher number of LEDs to be used with the reflector. FIG. 21 shows that, in one example a reflector optic 2100 having a plurality of segmented reflectors 2104, 150 LEDs 2102 can be placed around the revolved reflector. The LEDs are placed a spacing of 4.1 mm. The radius at the focal point of the reflector is 100 mm. The radii at the inner and outer edges are 87.8 mm and 133 mm respectively.

Figure 22:
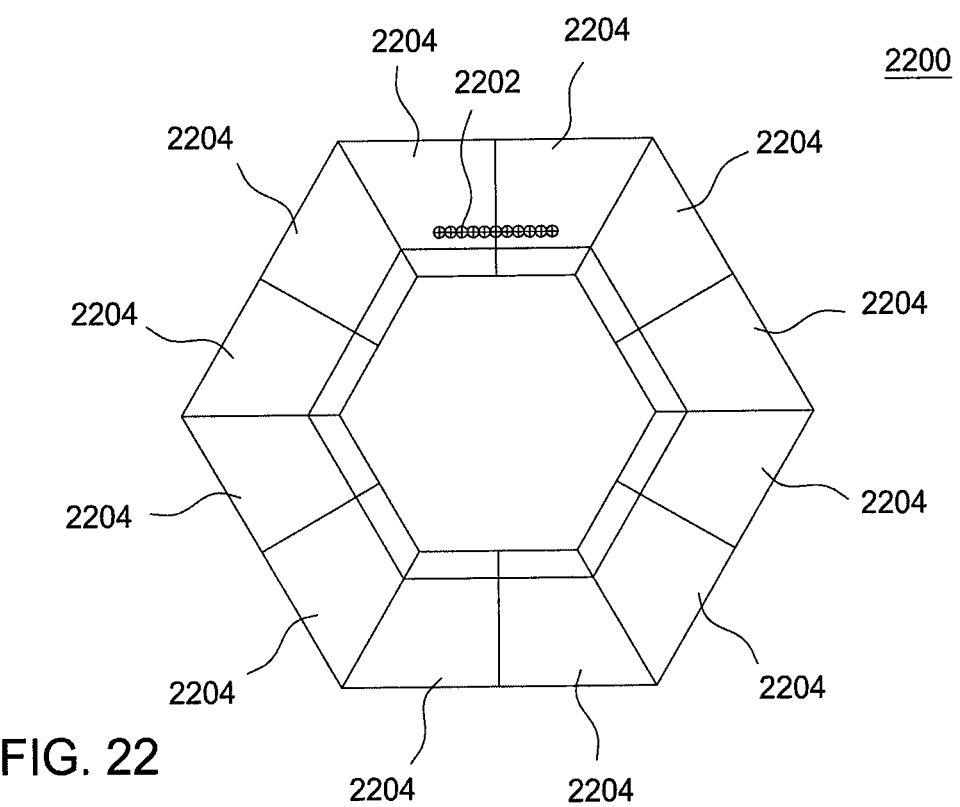
FIG. 22 depicts linear reflectors.

If linearly projected sections are used with a segmented reflector then some of the light from the LEDs near the intersection of the two reflectors is lost. Therefore, the LEDs should not be placed too close to the edges if high system efficiency is desired. FIG. 22 shows an embodiment of a reflector optic 2200 comprising a plurality of segmented reflectors 2204 having eighteen LEDs 2202 (not all LEDs shown) per reflector 2204 for a total of 108 LEDs 2202 when the LEDs 2202 are placed at a 4.1 mm spacing.

Figure 23:
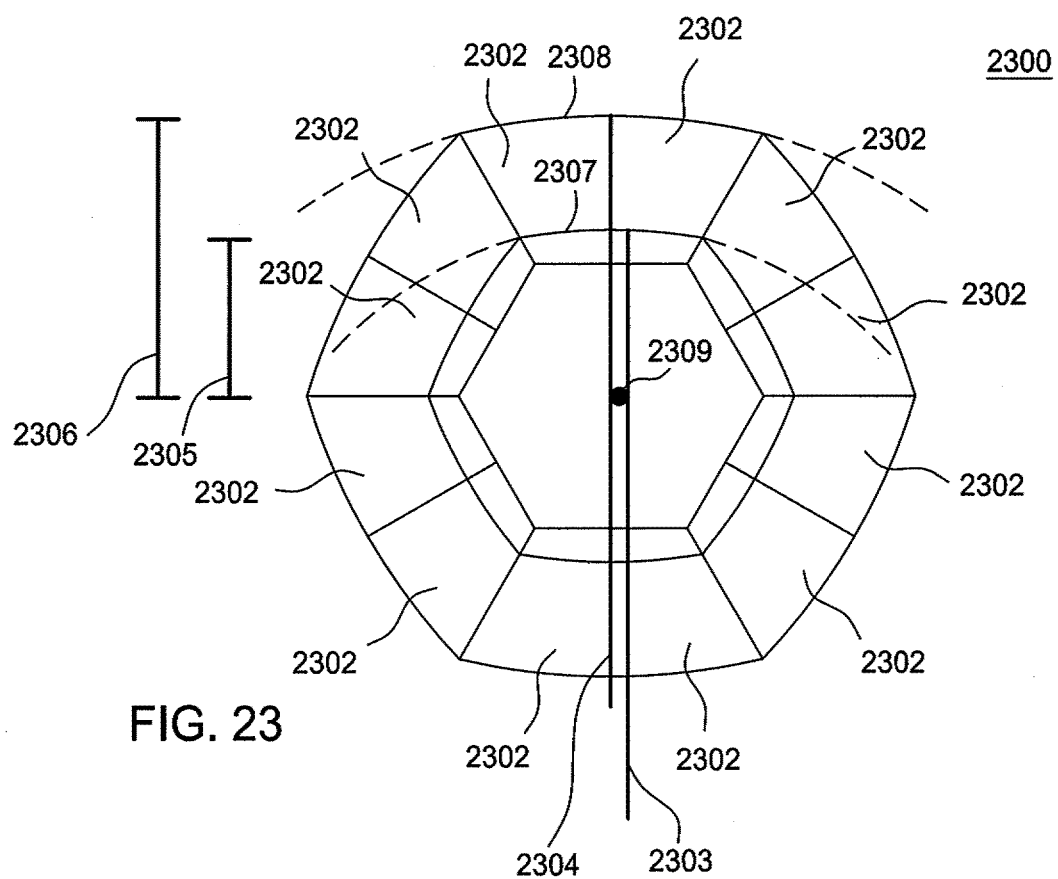
FIG. 23 depicts a segmented reflector with negative (convex) curvature.

In some applications an optimum configuration can be achieved by adding a limited degree of curved trajectory along the reflector cross section as shown in FIG. 23. The configuration shown of a reflector optic 2300 in FIG. 23 can be achieved by increasing the radius of the curved trajectory of the reflector shown in FIG. 16B and assembling six of the reflectors segments together. A plurality of reflector segments 2302 shown in FIG. 23 has a concave curved trajectory and each segment 2302 has a 100 mm radius of curvature. In one embodiment the curved trajectory follows a conic or substantially conic shape.

Figure 24:
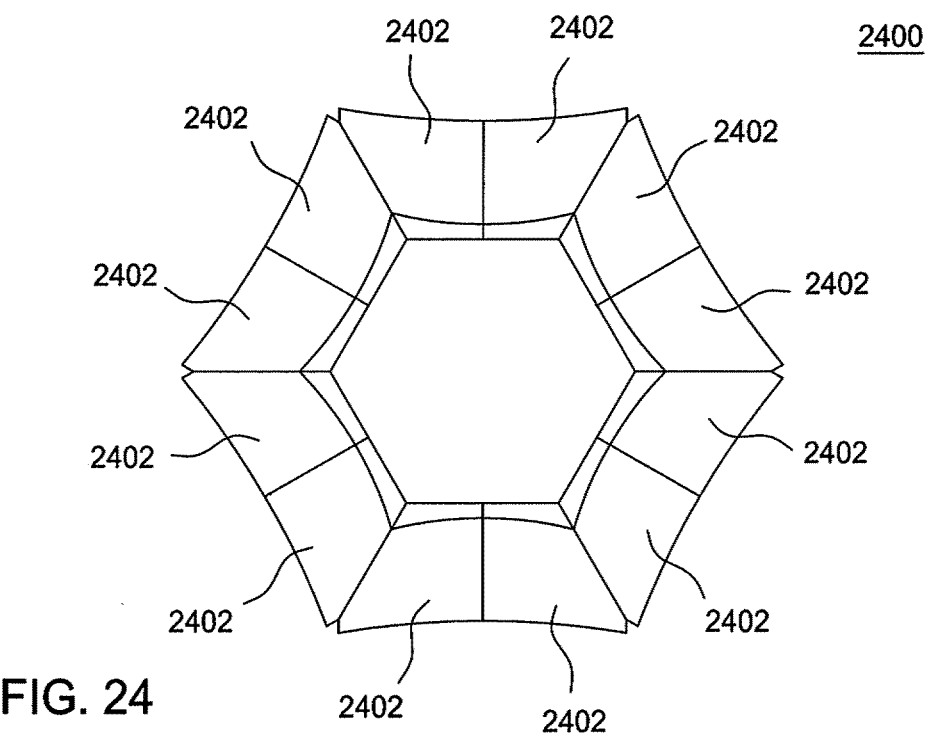
FIG. 24 depicts a segmented reflector with positive (concave) curvature.

The curved trajectory can be concave, as shown in FIG. 23, or can be convex, as shown in FIG. 24. FIG. 24 illustrates a reflector optic 2400 having a plurality of reflector segments 2402.

The reflector segments 2302 shown in FIG. 23 have a concave curved trajectory and each segment has a 100 mm radius of curvature. The radius of the curved trajectory should be large in order to limit the vertical beam divergence. In one embodiment, the inner radius 2303 or outer radius 2304 of the concave or convex curved trajectory is greater than two times a distance 2305 or a distance 2306, respectively, to the center of the light fixture 2309. In another embodiment, the inner radius 2303 or outer radius 2304 of the concave or convex curved trajectory is greater than two times a distance to the center area of the LEDs 2309. Combinations of concave and convex curved trajectories can be used. The concave and convex curved trajectories can form a smooth wavy trajectory or can have sharp transitions. The sharp transitions are illustrated in FIG. 23 and FIG. 24. In the case of combinations of concave and convex trajectories, the average inner or outer radius of the curvature of the concave or convex curved trajectory is greater than two times a distance to the center of the light fixture or LEDs 2309. In another embodiment, the average inner or outer radius of the curvature of the concave or convex curved trajectory is greater than two times the distance to the center area of the LEDs.

Figure 25:
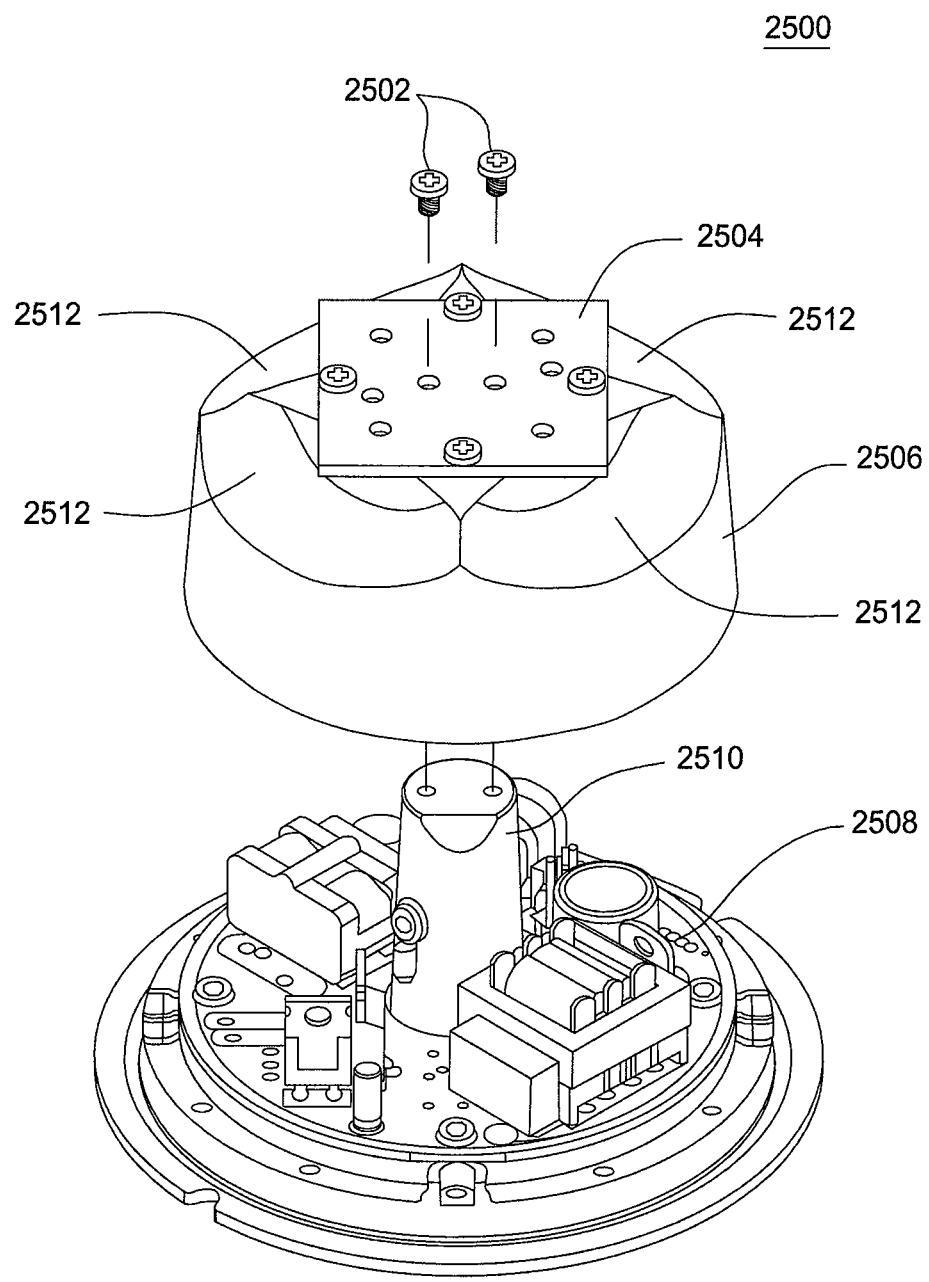
FIG. 25 depicts an exploded view of a beacon light using the segmented reflector with positive curvature; and To facilitate understanding, identical reference numerals have been used, where possible, to designate identical elements that are common to the figures.

FIG. 25 shows a beacon light 2500 that utilizes the light-emitting diode (LED) reflector optic 2506 with curved trajectory along the reflector cross sections 2512. In this application the reflector is mounted upside-down.

As illustrated in FIG. 25, a reflector optic 2506 having a plurality of curved reflector segments 2512 may then be placed over a power supply assembly 2508. The plurality of curved reflector segments 2512 may be concave, convex or a combination thereof, as described above. In addition, the relationship between the radius of curvature and a distance between a reflector segment 2512 to a respective LED, as discussed above. A LED circuit board 2504 may be coupled to or mounted on top of a stalk 2510. The reflector optic 2506 may be coupled to the stalk 2510 via one or more screws 2502.

The LED reflector optics and the various embodiments of a beacon light described within the present invention provide a more efficient optical system. This more efficient optical system results in smaller and lighter devices with lower energy consumption and less light pollution. The more efficient optical system also enables greater use of solar power to power the LED reflector optic and the beacon light.

Referring back to the reflector optic 24 and the beacon light 20 illustrated in FIG. 2, the reflecting surface 32 may comprise at least one of: a metal or a reflective material. For example, in one embodiment the reflecting surface 32 comprises a reflectorized surface such as, for example, a surface comprising a layered polymer which reflects light.

Figure 18:
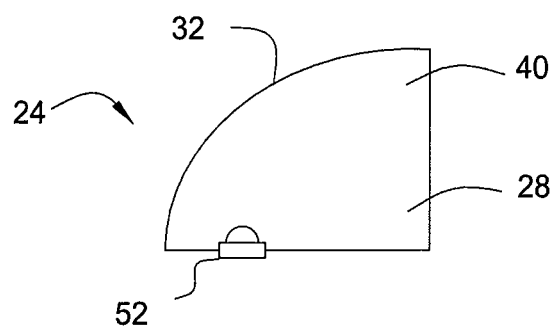
FIG. 18 depicts a partial sectional view of an embodiment of the LED reflector optic comprising at least one of: a glass, a plastic or a transparent material.

In another embodiment, depicted in FIG. 18, the reflector 28 comprises at least one of: glass, plastic or a transparent material. In the embodiment depicted in FIG. 18, the reflector 28 reflects light using total internal reflection.

The intensity distribution of light emitted from the LED reflector optic 24 can be adjusted by modifying the specific shape of the reflecting surface 32. In one embodiment, the shape of the cross-section 40 of the reflecting surface 32 is defined by the following equation:

$$z = \frac{cy^2}{1 + \sqrt{1 - (1+k)c^2 y^2}} + F(y), \quad (1)$$

where z is a coordinate along an axis parallel to the optical axis 36, y is a coordinate on an axis perpendicular to both the optical axis and the extrusion axis, k is a conic constant, c is a curvature, and F(y) is a variable function. FIG. 16A depicts the relationship of the z and y coordinates, as well as an x coordinate along an axis parallel to the extrusion axis 44, with respect to the reflecting surface 32.

In one embodiment, F(y) is equal to zero, and equation (1) provides a conic cross-section. For example, (k<−1) provides a hyperbola, (k=−1) provides a parabola, (−1<k<0) provides an ellipse, (k=0) provides a sphere, and (k>0) provides an oblate sphere, which are all forms of conics. Modifying k and c modifies the shape of the reflecting surface 32, and thus also modifies the shape of the light intensity distribution reflected by the reflecting surface 32. The reflected beam may thereby be made more narrow or broad as desired.

In one embodiment, F(y) is not equal to zero, and equation (1) provides a cross-sectional shape which is modified relative to a conic shape by an additional mathematical term or terms. For example, F(y) can be chosen to modify a conic shape to alter the reflected light intensity distribution in some desirable manner. Also, in one embodiment, F(y) can be used to provide a cross-sectional shape which approximates other shapes, or accommodates a tolerance factor in regards to a conic shape. For example, F(y) may be set to provide cross-sectional shape having a predetermined tolerance relative to a conic cross-section. In one embodiment, F(y) is set to provide values of z which are within 10% of the values provided by the same equation but with F(y) equal to zero.

In one embodiment, the specific cross-sectional conic shape of the reflecting surface 32 or the alternative reflecting surface 34 is defined by the following set of equations:

$$z = \frac{cr^2}{1 + \sqrt{1 - (1+k)c^2 r^2}}, \text{ and} \quad (2)$$

$$r^2 = x^2 + y^2; \quad (3)$$

where x, y, z, c and k are defined as above in regards to equation (1). FIG. 16B depicts the relationship of the x, y and z coordinates with respect to the alternative reflecting surface 34.

In another embodiment, the cross-sectional shape of the alternative reflecting surface 34 has a shape which comprises the basic conic shape modified by using additional mathematical terms. For example, in one embodiment, the cross-sectional shape of the reflecting surface 32 or the alternative reflecting surface 34 comprises a polynomial asphere defined by the following set of equations:

$$z = \frac{cr^2}{1 + \sqrt{1-(1+k)c^2 r^2}} + \sum_{n=2}^{10} C_{2n} r^{2n} \qquad (4)$$

$$r^2 = x^2 + y^2; \qquad (5)$$

wherein x, y, z, k and c are as defined above, and C is a constant.

In another embodiment, the shape of the cross-section 40 of the reflecting surface 32 or the alternative reflecting surface 34 is defined by fitting a curve, such as a spline fit, to a set of points. In one embodiment, the spline fit is used to approximate the conic or substantially conic cross-sectional shape of one embodiment of the cross-section 40. In one embodiment, the cross-section 40 of the reflecting surface 32 can be approximately matched using equation 1, 2 or 4.

In another embodiment, as depicted in FIG. 19, the reflector comprises a reflecting surface which is a faceted surface 32a which has a shape which approximates a conic shape. The faceted surface 32a comprises a plurality of individual planar facets 92. Collectively, the plurality of individual planar facets 92 approximate a conic shape, with the approximation becoming more accurate as the individual planar facets 92 are made smaller.

Figure 20:
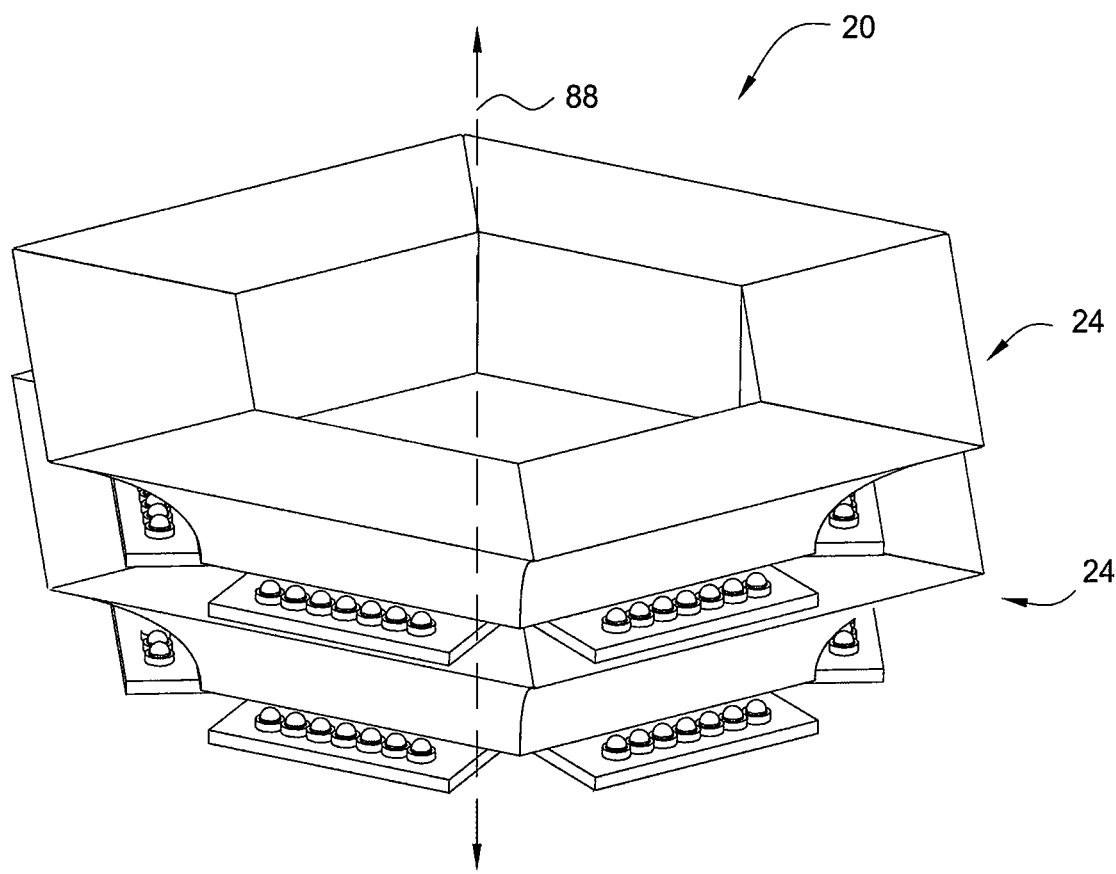
FIG. 20 depicts a partial perspective view of an embodiment of the beacon light having a plurality of the LED reflector optics.

In one embodiment, the beacon light 20 comprises a plurality of LED reflector optics. For example, FIG. 20 depicts a partial perspective view of an embodiment of the beacon light 20 which comprises a plurality of LED reflector optics 24 stacked on top of each other.

A method of providing an LED reflector optic or a beacon light is disclosed. In one embodiment, the method comprises arranging a plurality of reflecting surfaces 34 relative to each other, each one of the plurality of reflecting surfaces 34 comprising a curved cross-section, positioning at least one LED 52 at a focal distance of a respective one of said plurality of reflecting surfaces 34 and transmitting light from the at least one LED 52 onto at least one of the plurality of reflecting surfaces 34.

In one embodiment of the method, the at least one LED 52 comprises a plurality of LEDs 52, the at least one optical axis 36 comprises a plurality of optical axes 36, and the positioning step comprises positioning each of the plurality of LEDs 52 relative to a respective one of the plurality of optical axes 36 at about 90° and positioning each one of the plurality of LEDs 52 at a focal length at a respective one of the plurality of reflecting surfaces 34. In one embodiment of the method, each reflecting surface 34 comprises a cross-section 40 projected along a curved trajectory 48, and the arranging step comprises arranging the plurality of reflecting surfaces 34 relative to each other so that a plurality of the curved trajectories 48 are angled relative to each other.

In one embodiment, the reflector optic 24 comprises a plurality of reflecting means 34 for reflecting light in the direction of at least one optical axis 36, each reflecting means 34 comprising a curved cross-section 40. The optic also comprises at least one light emitting means 52 for emitting a hemisphere of light, the at least one light emitting means 52 positioned at a focal distance of a respective one of said plurality of reflecting means 34.

The present invention has been generally described within the context of the LED reflector optic and the beacon light. However, it will be appreciated by those skilled in the art that while the invention has specific utility within the context of the LED reflector optic and the beacon light, the invention has broad applicability to any light system.

While the foregoing is directed to embodiments of the present invention, other and further embodiments of the invention may be devised without departing from the basic scope thereof, and the scope thereof is determined by the claims that follow. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

The invention claimed is:

1. A light-emitting diode (LED) reflector optic, comprising:
   a reflector having a plurality of reflecting surfaces and being associated with at least one optical axis, each reflecting surface comprising a curved cross-section projected along a curved trajectory that is curved on a plane parallel to the at least one optical axis, wherein said curved trajectory comprises an inner radius and an outer radius, wherein a radius of said inner radius or said outer radius is greater than two times a distance to a center of a light fixture comprising the LED reflector optic; and
   at least one LED positioned at a focal distance of a respective one of said plurality of reflecting surfaces.

2. The LED reflector optic of claim 1, wherein said plurality of reflecting surfaces is coupled to form a circle.

3. The LED reflector optic of claim 1, wherein said curved trajectory is concave.

4. The LED reflector optic of claim 1, wherein said curved trajectory is convex.

5. The LED reflector optic of claim 1, wherein said plurality of reflecting surfaces comprises a concave curved trajectory and a convex curved trajectory.

6. The LED reflector optic of claim 1, wherein said curved trajectory comprises at least 100 millimeter (mm) radius of curvature.

7. A light-emitting diode (LED) reflector optic, comprising:
   a reflector having a plurality of reflecting surfaces and being associated with at least one optical axis, each reflecting surface comprising a curved cross-section projected along a curved trajectory that is curved on a plane parallel to the at least one optical axis, wherein said plurality of reflecting surfaces comprises a concave curved trajectory and a convex curved trajectory, wherein an average of radius of an inner radius or of an outer radius of said concave curved trajectory and said convex curved trajectory comprises greater than two times a distance to a center of a light fixture comprising the LED reflector optic; and
   at least one LED positioned at a focal distance of a respective one of said plurality of reflecting surfaces.

8. A reflector optic, comprising:
   a plurality of reflecting means for reflecting light in a direction of at least one optical axis, each reflecting means comprising a curved cross-section projected along a curved trajectory that is curved on a plane parallel to the at least one optical axis, wherein said curved trajectory comprises an inner radius and an outer radius, wherein a radius of said inner radius or said outer radius is greater than two times a distance to a center of a light fixture comprising the reflector optic; and at least one light emitting means for emitting a hemisphere of light positioned at a focal distance of a respective one of said plurality of reflecting means.

9. The reflector optic of claim 8, wherein said plurality of reflecting means is coupled to form a circle.

10. The reflector optic of claim 8, wherein said curved trajectory is concave.

11. The reflector optic of claim 8, wherein said curved trajectory is convex.

12. The reflector optic of claim 8, wherein said plurality of reflecting means comprises a concave curved trajectory and a convex curved trajectory.

13. The reflector optic of claim 8, wherein said curved trajectory comprises at least 100 millimeter (mm) radius of curvature.

14. A reflector optic, comprising:
a plurality of reflecting means for reflecting light in a direction of at least one optical axis, each reflecting means comprising a curved cross-section projected along a curved trajectory that is curved on a plane parallel to the at least one optical axis, wherein said plurality of reflecting means comprises a concave curved trajectory and a convex curved trajectory, wherein an average of radius of an inner radius or of an outer radius of said concave curved trajectory and said convex curved trajectory comprises greater than two times a distance to a center of a light fixture comprising the reflector optic; and
at least one light emitting means for emitting a hemisphere of light positioned at a focal distance of a respective one of said plurality of reflecting means.

15. A method, comprising:
arranging a plurality of reflecting surfaces relative to each other, each one of the plurality of reflecting surfaces comprising a curved cross-section projected along a curved trajectory that is curved on a plane parallel to the at least one optical axis, wherein said curved trajectory comprises an inner radius and an outer radius, wherein a radius of said inner radius or said outer radius is greater than two times a distance to a center of a light fixture comprising a reflector optic;
positioning at least one LED at a focal distance of a respective one of said plurality of reflecting surfaces; and
transmitting light from the at least one LED onto at least one of the plurality of reflecting surfaces.

16. The method of claim 15, wherein said plurality of reflecting surfaces is coupled to form a circle.

17. The method of claim 15, wherein said curved trajectory is concave.

18. The method of claim 15, wherein said curved trajectory is convex.

* * * * *